United States Patent Office 3,350,200
Patented Oct. 31, 1967

3,350,200
METHOD OF MAKING A SINTERED FUEL
CELL ELECTRODE STRUCTURE
Gerd Sandstede, Horst Binder, Alfons Kohling, and Kurt Richter, Frankfurt am Main, Germany, assignors to Robert Bosch G.m.b.H., Stuttgart, Germany
Filed June 22, 1965, Ser. No. 465,987
Claims priority, application Germany, June 27, 1964, B 77,437
13 Claims. (Cl. 75—208)

ABSTRACT OF THE DISCLOSURE

A sintered cathode structure for a fuel cell consisting of two coherent, porous nickel layers of different porosity and integral with each other is produced by superposing upon each other a first pulverulent layer consisting of a mixture of nickel powder and of a pulverulent nickel salt which when heated in a reducing atmosphere to the sintering temperature of nickel will be decomposed under formation of metallic nickel and gaseous products, and a second pulverulent layer consisting of a mixture of the material of the first layer with a pulverulent pore-forming material adapted to be removed under conditions which will not cause removal of nickel. The thus superposed pulverulent layers are jointly compressed to form a compressed composite layer which is heated in a reducing atmosphere at the sintering temperature of nickel to reduce the pulverulent nickel salt of the compressed composite layer to metallic nickel, thereby forming a porous coherent nickel body and removing the pore-forming material from the portion of the composite layer formed of the second layer without causing removal of nickel, thereby increasing the porosity of said portion and forming a coherent sintered nickel body consisting of two layers of different porosity integral with each other.

---

Figure 1:
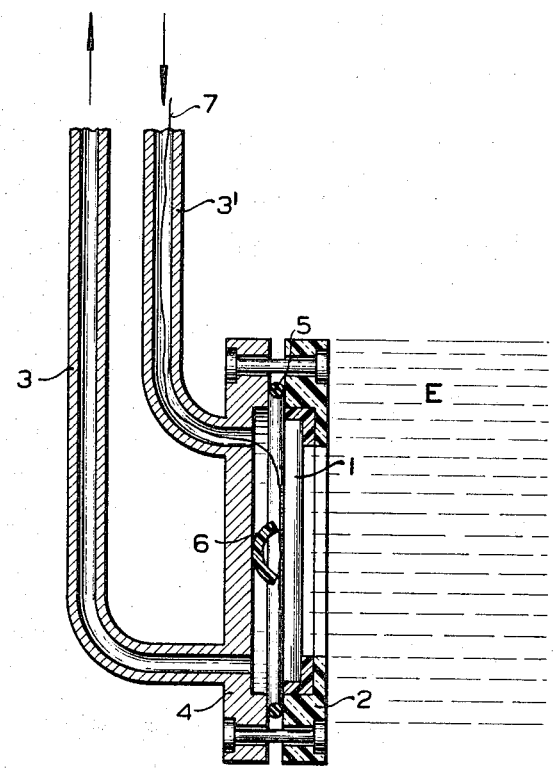

The present invention relates to a fuel cell electrode structure and method of making the same and, more particularly, the present invention is concerned with electrode structures of which the cathode of gas-impermeable fuel cells especially those which are operated with air as the source of oxygen may be formed, as well as to completed electrodes, for instance such cathodes.

The term "electrode structure" or similar terms are intended to denote a body which has the structure and configuration of the respective electrode, according to a preferred embodiment of the present invention of a gas-impermeable cathode for a fuel cell, however, to which structure preferably a catalyst is applied in order to convert the same into the respective electrode. Thus, the cathode structure of the present invention may be converted into a cathode by being impregnated with a silver-containing solution and then further treated in such a manner that the walls of the pores of the cathode structure will be coated with silver as the catalyst. It would also be possible to convert the electrode structure of the present invention into hydrogen electrodes or anodes, by applying to the walls of the pores thereof a suitable catalyst such as palladium.

The conventional, so-called gas-tight, oxygen cathodes consist of two abutting, catalytically active layers having pores of different diameters. These cathodes are inserted into a cathode holding member of the fuel cell, in such a manner that the surface of the finely porous layer is outwardly directed toward the electrolyte. The opposite surface of the cathode which is formed by the portion or layer thereof which has pores of greater diameter and which will not be in contact with the electrolyte, is supplied with oxygen gas which in turn is introduced into a cavity of the electrode holding member under such overpressure that the cathode layer of greater pore size which faces the gas space of the electrode holding member will remain free of electrolyte. Upon operation of the fuel cell, the oxygen is then reductively dissolved at the boundary zone between the two cathode layers of different porosity. Such double-layer cathodes prevent the passage of undissolved oxygen into the electrolyte which cannot be prevented in the operation of single layer porous cathodes.

Such gas-tight or gas-impermeable oxygen cathods are conventionally produced by first compressing a mixture of carbonyl nickel powder and relatively coarse ammonium carbonate powder to form a disk thereof, followed by sintering, whereby the ammonium carbonate will be volatilized and pores will remain which correspond to the space previously occupied by the ammonium carbonate. In this manner a nickel disk of relatively coarse or large-porous structure is formed. Thereafter, an alcoholic slurry of carbonyl nickel powder is applied to one face of the coarsely porous nickel disk so that the carbonyl nickel powder of the slurry will settle thereon. Sintering is then repeated and, in this manner, a second porous nickel layer with very fine pores is sintered onto the first nickel disk of relatively large pore diameter, this finely porous second nickel layer must be of lesser thickness than the first formed nickel disk due to its lesser porosity. Cathodes produced in this manner have the following additional disadvantages:

If air is used instead of pure oxygen, then the nitrogen of the air will accumulate in the pores of the nickel disk portion having larger pores and, consequently, the oxygen concentration will decrease in the direction from the coarsely porous surface of the disk which is exposed to the air towards the boundary line between the disk portion formed with coarse or large pores and the contacting finely porous layer. Since, however, the current density increases with increasing oxygen concentration in the boundary zone in which the reductive dissolution of oxygen takes place, and since fresh oxygen has to diffuse first through the nitrogen in the pores of the portion of the electrode having relatively larger pores, this layer formed with larger pores also should be as thin as possible. The thickness of the layer having the larger pores, however, must not be reduced below a lower limit at which this layer still has sufficient mechanical strength. This lower limit, however, is so high, i.e.—the required thickness is so great that, in the case of gas-tight electrodes used in fuel cells operating with air as oxygen carrier, the oxygen concentration in the above-described boundary zone will be considerably below the norm and the electrode will supply only a very low current density.

It is therefore an object of the present invention to provide a gas-impermeable electrode structure for a fuel cell which will not be subject to the above-discussed disadvantages.

It is a further object of the present invention to provide a method of making such gas-impermeable electrode structures, as well as complete cathodes and anodes, which can be carried out in a simple and economical manner and which will result in the production of improved gas-impermeable electrode structures or electrodes.

Other objects and advantages of the present invention will become apparent from a further reading of the description and of the appended claims.

With the above and other objects in view, the present invention contemplates a method of producing a sintered body adapted to form a gas-impermeable cathode structure for a fuel cell, comprising the steps of forming, superposed upon each other, a first layer consisting essentially of an intimate first mixture of nickel powder and a pulverulent nickel salt adapted upon heating in a reducing atmosphere to the sintering temperature of nickel to be decomposed under formation of metallic nickel and gaseous decomposition products, and a second layer consisting essentially of an intimate mixture of the first mixture and of a pulverulent pore-forming material adapted to be removed under conditions which will not cause removal of nickel, compressing the superposed layers, heating the compressed superposed layers in a reducing atmosphere at a temperature between about 650° C. and 750° C. so as to reduce the pulverulent nickel salt of the layers to metallic nickel and to form a porous, coherent sintered nickel body of the originally present pulverulent nickel and the nickel formed by reduction of the reducible nickel salt of the two layers, and removing the pulverulent pore-forming material from the portion of the coherent sintered nickel body formed of the second layer thereby increasing the porosity of the latter, whereby a coherent sintered nickel body is formed consisting of two integral layers of different porosity.

The present invention also includes a sintered body adapted to form a gas-impermeable cathode structure for a fuel cell, the body consisting essentially of two abutting sintered nickel layers integral with each other, one of the layers being formed with interconnected pores of a radius sufficiently small to prevent passage of air therethrough at an absolute pressure of up to about 2 atmospheres, and the other of the layers having interconnected larger pores and being of a thickness not exceeding the thickness of the one layer.

Thus, according to the present invention, a much more effective gas-impermeable oxygen cathode can be produced, by forming in the matrix of a pressure mold a first, relatively thick layer consisting of a mixture of approximately equal proportions by volume of carbonyl nickel powder and nickel carbonate, and forming on top of the first layer a second layer which has at most the same thickness as the first layer but preferably is of considerably lesser thickness and which consists of an intimate mixture of about equal proportions by volume of the mixture of the first layer and of a pore-forming additional pulverulent material.

The two superposed pulverulent layers are then simultaneously compressed into a composite disk or the like, and thereafter sintered at a temperature of preferably between about 650° C. and 750° C. The first layer may consist of between 60 and 40% by volume of carbonyl nickel powder and between 40 and 60% by volume of nickel carbonate, while the second, usually thinner, layer may consist of between 60 and 40% of the pore-forming pulverulent material and of between 20 and 30% of carbonyl nickel powder and between 20 and 30% of nickel carbonate, preferably a basic nickel carbonate.

Due to forming the first layer of a mixture of carbonyl nickel powder and nickel carbonate, the structure obtained thereof after compression and sintering will be of much greater porosity than a sintered layer which is produced in accordance with the above-described prior art methods. Consequently, due to its higher porosity, the thus formed finely porous sintered layer may be of considerably greater thickness than the corresponding finely porous layer of the above-described prior art structures, so that, according to the present invention, the finely porous layer will provide sufficient mechanical strength for the electrode structure, even if the second, namely the more coarsely porous layer, is relatively thin. For instance, by proceeding according to the present invention, the thickness of the finely porous layer may be between 2 and 3 mm. and the thickness of the more coarsely porous layer may be between 0.5 and 1 mm., and it will be found that the thus-produced sintered electrode or electrode structure is gas-impermeable when exposed to a gas pressure of between 0.5 and one atmosphere above atmospheric pressure.

Since nickel electrodes will produce only low current densities, it is generally preferred to deposit or precipitate in the pores of the sintered nickel structure a catalytic metal, such as silver if a cathode is to be produced. It is important thereby to precipitate the smallest possible catalyst crystals and, as far as possible, to cover the entire inner surface of the sintered nickel structure therewith. For this purpose, it has been proposed to immerse the sintered nickel body into hot ammoniacalic silver carbonate solution and, after subsequent drying, to reduce the silver carbonate in the pores of the sintered nickel body at 150° C. in a hydrogen gas stream.

However, it has been found to be particularly advantageous in connection with the sintered nickel structure produced according to the present invention, to boil the sintered nickel structure for a prolonged period of time, for instance 5 minutes, in a solution of silver carbonate and ammonium carbonate in aqueous ammonia, and thereafter drying the sintered nickel structure so as to deposit silver carbonate in the pores thereof which then can be reduced to silver. This is particularly advantageous when as pore-forming addition to the pulverulent layer of which the sintered layer of larger pore size is formed, a substance such as ammonium carbonate, sodium chloride or a mixture of these two substances has been used. During the prolonged boiling, air entrapped in the pores is expelled and dissolution of nickel oxide, which possibly might have been formed during storage of the sintered structure, is achieved. Furthermore, it is accomplished in this manner that the silver coating at the inner surface of the sintered nickel body will be a continuous coating. After boiling of the sintered nickel body in the aqueous ammoniacalic solution, the same is removed from the solution and freeze dried. The dried sintered body, the pores of which are now filled with silver carbonate and ammonium carbonate are then heated in a hydrogen atmosphere at about 150° C., whereby the ammonium carbonate is volatilized and the silver carbonate is reduced to a porous coating of metallic silver.

The gas-impermeable oxygen cathode according to the present invention has in seven-normal potassium hydroxide, at room temperature and when operated with oxygen gas, a rest potential of 1.120 millivolt, or at 80° C. of 1.080 millivolt, as determined against the reversible hydrogen electrode in the same solution. Under load, at a current density of 100 ma./cm.$^2$ at 80° C., a potential of 920 mv. will be obtained which is reduced by only 50 mv. if the pure oxygen is replaced by air. The silver content of the electrode amounts to only about 50 mg./cm.$^2$.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which FIG. 1 is a schematic elevational cross sectional fragmentary view of a fuel cell including a gas-impermeable cathode according to the present invention; and FIG. 2 is a greatly enlarged schematic cross sectional fragmentary view of a gas-impermeable fuel cell cathode according to the present invention.

Figure 2:
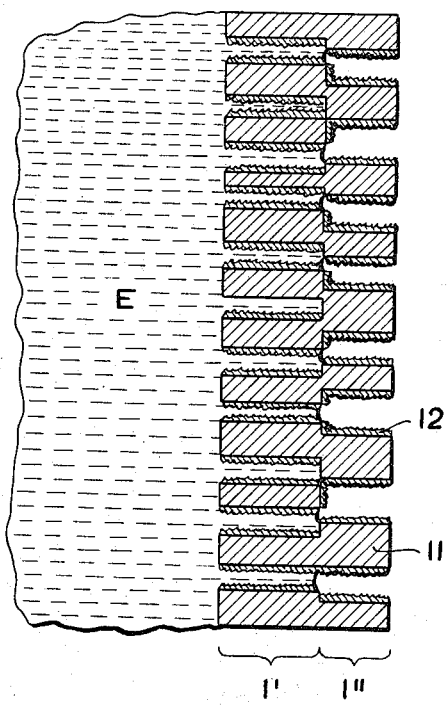

Referring now to the drawing, and particularly to FIG. 1, an electrode 1 according to the present invention is shown consisting of a two-layer sintered nickel body comprising a layer with smaller pores facing the electrolyte E, and a layer with pores of larger diameter facing in the opposite direction. The electrode 1 is adhesively adhered to an annular member 2 of Plexiglas, using Araldit as the binder. Annular member 2 is adhered by means of a screw connection to holding member 4 provided with two conduits 3 and 3' and consisting of high-grade steel. A gasket 5 of acid resistant rubber is interposed, as indicated in the drawing. The silver coated conductive wire 7 which serves for withdrawing current from electrode 1 is pressed against electrode 1 by means of resilient member 6. Wire 7 passes, electrically insulated, through tube 3' which tube or conduit serves simultaneously for the introduction of oxygen or air. The spent air from which a portion of its original oxygen content has been withdrawn during operation of the fuel battery escapes through conduit 3. Conduit 3 may include a needle valve and a flow meter (both not shown). Electrolyte E consists of 7N KOH and is maintained at 80° C. The oxygen or the air in contact with electrode 1 is maintained at an absolute pressure of between 1.5 and 2 atmospheres at which the gas cannot pass through electrode 1. When it is desired to supply the cathode 1 with air as the source of oxygen, then the flow velocity of the air has to be adjusted according to the desired current density. If 50% of the oxygen of the air is to be consumed, then 2.2 liters of air per hour will be required for producing current of 1 ampere.

According to the present invention, it is possible to form the sinter electrode structure with a finely porous layer which is at least as thick or even thicker than the abutting, integral layer of larger pore diameters. It is thus not necessary to limit the thickness of the finely porous layer, as is required in accordance with the prior art structures discussed further above, due to the fact that the porosity of the finely porous layer according to the present invention is considerably higher than that of the finely porous layer of conventional electrodes of this type. Sintering, in accordance with the present invention, a mixture of very finely subdivided basic nickel carbonate and very finely subdivided carbonyl nickel powder will result in a sintered layer of sufficiently high porosity formed with even, very narrow pores and possessing a greatly increased mechanical strength.

For instance, by compressing 50% by volume of basic nickel carbonate and 50% by volume of carbonyl nickel powder at a pressure of 2,000 kg. per cm.$^2$, substantially as described further below in Example 1, the thus-formed compressed layer will have a porosity of 33%. After reduction of the basic nickel carbonate constituent of the layer, the porosity will be increased by $$\frac{67\times50\times86}{100\times100}\% = 29\%$$

and after sintering at 650° C. which is connected with a linear shrinkage of 4%, corresponding to a shrinkage of the volume by about 12%, the total porosity will be equal to 33+29−12, or to 50%.

The pores of the thus produced finely porous layer are so narrow that the electrode will remain gas-tight at an absolute pressure of between 1.5 and 2 atm. This corresponds to a maximum pore radius of $1.5\times10^{-4}$ cm. in the finely porous layer.

The integral layer of greater porosity which is exposed to the compressed oxygen or air should have the maximum possible porosity, since the mechanical strength and stability of the composite electrode structure is assured by the relatively thick finely porous layer.

Thus, for instance by proceeding in accordance with Example 1 below, the total porosity of the sintered layer having the larger pores will equal 60% derived from the decomposition of the pore-forming ammonium bicarbonate, plus 25% derived from the mixture of nickel nitrate and carbonyl nickel powder, minus 12% due to shrinkage upon sintering, giving a total porosity of 73%.

This is about the maximum porosity which can be obtained with ammonium carbonate as the pore-forming material. The practical minimum would be reached by using only 40% by volume of ammonium hydrogen carbonate in the mixture of which the electrode layer having the larger pores is to be formed.

Similarly, for practical purposes, the limit of the total porosity of the finely porous layer will be determined by the proportion of basic nickel carbonate or the like in the mixture of which the finely porous layer is formed.

As indicated, preferably this proportion will be between 40 and 60% by volume.

The thickness of the finely porous layer preferably will be between 1.5 and 3 mm., and most preferably about 2 mm., while the thickness of the layer having the larger pores preferably will be between 0.5 and 2.5 mm., and most preferably about 1.5 mm. However, the layer having the larger pores should have a thickness which does not exceed and preferably is smaller than the thickness of the finely porous layer.

Referring now to FIG. 2, it will be seen in a greatly enlarged and schematic manner that the electrode consists of an integral porous structure comprising a layer 1' which is exposed to the electrolyte and which is formed with pores of smaller diameter, and a layer 1" which is exposed to the oxygen or air and which is formed with larger ports. The integral structure consists of a nickel body 11 and a continuous porous silver coating 12 at the wall of the pores thereof.

The above described carbonyl nickel powder may be replaced with nickel powders produced by different processes, provided that the nickel powder is about of the same purity as carbonyl nickel powder, particularly with respect to a low sulfur content, and has about the same particle size.

The basic nickel carbonate $NiCO_3.2Ni(OH)_2.4H_2O$ is a commercially available product, which, however, may also be replaced by other carbonates such as

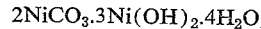

$$2NiCO_3.3Ni(OH)_2.4H_2O$$

In case of such replacement, it is generally advisable to change the proportion of the nickel carbonate corresponding to the difference in its formula. The same holds also true for the use of the double salt

$$(NH_4)HCO_3.NiCO_3.4H_2O$$

which already contains in its molecule pore-forming $NH_4$. This double salt, like the above-mentioned basic nickel carbonates, is obtained in the form of a finely subdivided precipitate. Similarly, nickel oxalate $Ni(COO)_2.2H_2O$ may be used, which also is generally obtained as a very fine powder. The relatively well crystallizing compounds, for instance $Ni(HCOO)_2.2H_2O$ are less suitable due to larger particle size.

The particle size of the carbonyl nickel powder or other suitable nickel powders should be between about 0.5 micron and 10 microns, preferably between 2 and 8 microns. The particle size of the basic nickel carbonate or the like should not exceed 10 microns. The particles of the ammonium carbonate also should have a size of between about 2 and 10 microns. It is desirable to screen the ammonium carbonate through a sieve having a mesh width of about 60 microns in order to separate larger agglomerated particles.

The commercially available ammonium carbonate consists primarily of ammonium bicarbonate or ammonuim hydrogen carbonate $(NH_4)HCO_3$, and contains in addition ammonium carbamate $(NH_4)CO_2.NH_2$, and ammonium carbonate $(NH_4)_2CO_3$.

The particle size of sodium chloride as a pore-forming material may be between about 5 and 100 microns, preferably between 20 and 60 microns.

The amount of silver which remains on the walls of the pores of the sintered nickel structure after boiling of the same, in accordance with the present invention, in ammoniacalic silver carbonate solution, depends on the length of time of the boiling and may vary between about 5 and 120 mg./cm.$^2$. Preferably, the silver coating should amount to between 40 and 90 mg./cm.$^2$. The thickness or weight of the silver coating can be controlled by suitably changing the length of time for which boiling of sintered body is carried out in the silver carbonate solution. For instance, boiling for 5 minutes as described in more detail in Example 1 below and at the porosity of the sintered body, described therein, will result in the deposition of an amount of silver equal to about 50 mg./cm.²

Sodium chloride and ammonium carbonate as pore-forming materials may also be replaced by potassium chloride and sodium carbonate, however, the two last-mentioned compounds are somewhat more expensive, and furthermore due to the low melting point of the potassium chloride (768° C.), sintering, when potassium chloride is employed as the pore-forming compound, must be carried out at a temperature below 700° C.

The following examples are given as illustrative only, without, however, limiting the invention to the specific details of the examples.

*Example 1*

Basic nickel carbonate, $NiCO_3.2Ni(OH)_2.4H_2O$ having a particle size of less than 10 microns is mixed in equal parts by volume with carbonyl nickel powder having a particle size of between 2 and 5 microns. The thus-formed mixture is divided into two portions. One portion is retained as is, while the other portion is mixed with 60% by volume of ammonium carbonate having a particle size of up to 60 microns.

Fifteen grams of the portion which does not contain ammonium carbonate are placed into the matrix of a cylindrical compression mold having a diameter of 50 mm. Thereafter, 4 grams of the portion containing ammonium carbonate is placed on top of the first formed layer.

In this manner, two superposed layers are formed in the compression mold. These two superposed layers are then compressed at a pressure of 2,000 kg./cm.² and the thus-formed coherent, shape retaining compressed body is first heated in air to 150° C. in order to cause evaporation of the ammonium carbonate, and thereafter further heated in a hydrogen atmosphere at a temperature of 300° C. in order to reduce the nickel carbonate. Thereafter, the thus treated body is sintered in a hydrogen or argon atmosphere at 700° C. In this manner a sintered cathode structure is obtained which is now boiled for about 5 minutes in a solution of 50 grams silver carbonate and 10 grams ammonium carbonate in 100 cm.³ aqueous ammonia having a concentration of 5 mols per liter, so that only silver carbonate and ammonium carbonate are retained in the pores of the sintered body. The electrode body is now heated to 150° C. in a hydrogen atmosphere whereby the silver carbonate will be reduced to silver and the ammonium carbonate will be volatilized.

The sintering temperature preferably will be within 550° and 750° C. To a considerable extent, the effect of the temperature within the above range can be compensated by changing the length of time for which sintering is carried out. Thus, when it is required to sinter for more than one hour at 600° C., then substantially the same result can be achieved by sintering at 750° C. for about 5 minutes. However, it creates great practical difficulties to maintain such short sintering periods with any degree of accuracy, particularly due to variations in the period of time required to reach the desired sintering temperature. In view thereof, according to the present example, sintering is carried out for 40 minutes at a temperature of 650° C.

The thickness of the finely porous layer of the electrode produced according to the present example will be 1.9 mm. and the thickness of the layer having larger pores 0.9 mm. The porosity of the finely porous layer, after incorporation of the silver, equals 48% and the porosity of the layer having the larger pores 70%.

During sintering, the porous body will experience a linear shrinkage of about 4%.

*Example 2*

The method followed according to the present example corresponds to a considerable degree to that described in Example 1. However, the ammonium carbonate as pore-forming material for the more highly porous layer is replaced with sodium chloride which does not evaporate upon sintering so that the shrinkage of the nickel body during sintering is reduced. Thereby, a larger degree of porosity is obtained and the required degree of oxygen pressure above atmospheric pressure will be reduced without any change in the activity of the electrode. Since, however, thereby the mechanical strength or stability of the electrode is somewhat reduced, it is desirable, particularly in the case of electrodes having large surface areas, to provide the electrode body with a suitable supporting grid. The degree of porosity can also be controlled by using as the pore-forming material a mixture of ammonium carbonate and sodium chloride.

Preferably, the particle size of the sodium chloride will be below 90 microns. The porosity of the sintered layer formed by initial incorporation of sodium chloride will amount to 83%, whereby, furthermore, on the average, the individual pores will have greater diameters than pores formed with ammonium carbonate as the pore-forming agent or material, so that it is possible to operate the electrode with a lesser operating oxygen or air pressure, although the finely porous layer which is exposed to the electrolyte would be able to withstand considerably higher pressures such as are sometimes required when the cathodes are to operate with air as the oxygen carrying gas.

According to the present example, the particle size of the sodium chloride is between 25 and 43 microns. The sodium chloride is removed by dissolution in hot water prior to immersion of the sintered body into the silver salt-containing solution.

The supporting grid which may be used according to the present example, particularly if the electrodes have a relatively large surface area may be formed of nickel, Monel metal or other metals which are resistant to alkaline solutions.

By suitably mixing ammonium carbonate and sodium chloride and using such mixtures as the pore-forming material, degrees of porosity can be obtained which lie between those which, on the one hand, are obtained with sodium chloride and, on the other hand, are obtained with ammonium carbonate as the pore-forming material.

The linear shrinkage during sintering of the body in accordance with the present example, wherein sodium chloride is used as the pore-forming material, amounts to only 0.8%.

*Example 3*

The sintered body is produced as described in Example 1. However, instead of reducing the silver carbonate in the pores of the sintered nickel body in a hydrogen gas atmosphere, the silver carbonate is cathodically reduced. For this purpose, the electrode is immersed, after having been impregnated with the silver salt-containing solution and dried, as cathode into an aqueous ammonium carbonate solution having a concentration of about 3 moles per liter against a hydrogen test electrode as anode and a constant voltage of 100 millivolts is applied to the two electrodes.

It will be understood that each of the elements described above, or two or more together, may also find a useful application in other types of gas-impermeable electrode structures differing from the types described above.

While the invention has been illustrated and described as embodied in a gas-impermeable silver-coated nickel cathode for a fuel cell, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this inven-

What is claimed as new and desired to be secured by Letters Patent is:

1. A method of producing a sintered body capable of forming a gas-impermeable cathode structure for a fuel cell, comprising the steps of forming, superposed upon each other, a first pulverulent layer consisting essentially of a first mixture of nickel powder and of a pulverulent nickel salt which upon heating in a reducing atmosphere to the sintering temperature if nickel will be decomposed under formation of metallic nickel and gaseous decomposition products, and a second pulverulent layer consisting essentially of a mixture of said first mixture and of a pulverulent pore-forming material which can be removed under conditions which will not cause removal of nickel; jointly compressing said superposed layers, thereby forming thereof a compressed composite layer; heating said compressed composite layer in a reducing atmosphere at a temperature between about 650° C. and 750° C. thereby reducing said pulverulent nickel salt of said layers to metallic nickel and also forming gaseous decomposition products, thereby forming a porous, coherent sintered nickel body of the originally present pulverulent nickel and the nickel formed by reduction of said reducible nickel salt of said two layers; and removing said pulverulent pore-forming material from the portion of said coherent sintered nickel body formed of said second layer without causing removal of nickel thereby increasing the porosity of the latter, whereby a coherent sintered nickel body is formed consisting of two layers of different porosity integral with each other.

2. A method of producing a sintered body capable of forming a gas-impermeable cathode structure for a fuel cell, comprising the steps of forming, superposed upon each other, a first pulverulent layer consisting essentially of a first mixture of approximately equal proportions of nickel powder and of a pulverulent nickel salt which upon heating in a reducing atmosphere to the sintering temperature of nickel will be decomposed under formation of metallic nickel and gaseous decomposition products, and a second pulverulent layer having a thickness not exceeding the thickness of said first layer and consisting essentially of a mixture of said first mixture and of a pulverulent pore-forming material which can be removed under conditions which will not cause a removal of nickel; jointly compressing said superposed layers, thereby forming thereof a compressed composite layer; heating said compressed composite layer in a reducing atmosphere at a temperature between about 650° and 750° C. thereby reducing said pulverulent nickel salt of said layers to metallic nickel and also forming gaseous decomposition products, thereby forming a porous, coherent sintered nickel body of the originally present pulverulent nickel and the nickel formed by reduction of said reducible nickel salt of said two layers; and removing said pulverulent pore-forming material from the portion of said coherent sintered nickel body formed of said second layer without causing removal of nickel, thereby increasing the porosity of the latter, whereby a coherent sintered nickel body is formed consisting of two layers of different porosity and integral with each other.

3. A method of producing a sintered body capable of forming a gas-impermeable cathode structure for a fuel cell, comprising the steps of forming, superposed upon each other, a first pulverulent layer consisting essentially of a first mixture of approximately equal proportions of carbonyl nickel powder and of a nickel carbonate which upon heating in a reducing atmosphere to the sintering temperature of nickel will be decomposed under formation of metallic nickel and gaseous decomposition products, and a second pulverulent layer having a thickness not exceeding the thickness of said first layer and consisting essentially of a mixture of approximately equal proportions of said first mixture and of a pulverulent pore-forming material which can be removed under conditions which will not cause removal of nickel; jointly compressing said superposed layers, thereby forming thereof a compressed composite layer; heating said compressed composite layer in a reducing atmosphere at the sintering temperature of nickel thereby reducing said nickel carbonate of said layers to metallic nickel and also forming gaseous decomposition products, thereby forming a porous, coherent sintered nickel body of the originally present pulverulent carbonyl nickel and the nickel formed by reduction of said nickel carbonate of said two layers; and removing said pulverulent pore-forming material from the portion of said coherent sintered nickel body formed of said second layer without causing removal of nickel, thereby increasing the porosity of the latter, whereby a coherent sintered nickel body is formed consisting of two layers of different porosity and integral with each other.

4. A method of producing a sintered body capable of forming a gas-impermeable cathode structure for a fuel cell, comprising the steps of forming, superposed upon each other, a first pulverulent layer consisting essentially of a first mixture of approximately equal proportions of carbonyl nickel powder and of a pulverulent nickel carbonate which upon heating in a hydrogen atmosphere to the sintering temperature of nickel will be decomposed under formation of metallic nickel and gaseous decomposition products, and a second pulverulent layer having a lesser thickness than first layer and consisting essentially of a mixture of approximately equal proportions of said first mixture and of a pulverulent pore-forming material which can be removed under conditions which will not cause removal of nickel; jointly compressing said superposed layers, thereby forming thereof a compressed composite layer; heating said compressed composite layer in a hydrogen atmosphere at the sintering temperature of nickel thereby reducing said nickel carbonate of said layers to metallic nickel and also forming gaseous decomposition products, thereby forming a porous, coherent sintered nickel body of the originally present pulverulent carbonyl nickel and the nickel formed by reduction of said nickel carbonate of said two layers; and removing said pulverulent pore-forming material from the portion of said coherent sintered nickel body formed of said second layer without causing removal of nickel, thereby increasing the porosity of the latter, whereby a coherent sintered nickel body is formed consisting of two layers of different porosity and integral with each other.

5. A method of producing a sintered body capable of forming a gas-impermeable cathode structure for a fuel cell, comprising the steps of forming, superposed upon each other, a first pulverulent layer consisting essentially of a first mixture of between 60% and 40% of carbonyl nickel powder and of between 40 and 60% of a basic nickel carbonate, and a second pulverulent layer having a thickness not exceeding the thickness of the first layer and consisting essentially of a mixture of between 40 and 60% by volume of said first mixture and between 60 and 40% by volume of a pulverulent pore-forming material which can be removed under conditions which will not cause removal of nickel; jointly compressing said superposed layers thereby forming a coherent self supporting structure thereof; heating the thus formed coherent structure in a hydrogen atmosphere and at a temperature between about 650° C. and 750° C. thereby reducing said basic nickel carbonate of said first and second layers to metallic nickel and also forming gaseous decomposition products, thereby forming a porous coherent sintered nickel body of said compressed superposed layers; and removing said pulverulent pore-forming material from the portion of said coherent sintered nickel body formed of said second layer without causing removal of nickel, whereby a coherent sintered nickel body is formed consisting of a first portion formed of said first layer and having pores of relatively small radius and a lesser overall porosity, and a second portion integral with said first portion formed of said second layer, and having pores of relatively greater radius and a greater overall porosity due to the removal of said pore-forming material.

6. A method of producing a sintered body capable of forming a gas-impermeable cathode structure for a fuel cell, comprising the steps of forming, superposed upon each other, a first pulverulent layer consisting essentially of a first mixture of between 60% and 40% of carbonyl nickel powder and of between 40 and 60% of a basic nickel carbonate, and a second pulverulent layer having a thickness not exceeding the thickness of the first layer and consisting essentially of a mixture of between 40 to 60% by volume of said first mixture and between 60 and 40% by volume of a pulverulent pore-forming material selected from the group consisting of ammonium carbonate and sodium chloride which can be removed under conditions which will not cause removal of nickel; jointly compressing said superposed layers thereby forming a coherent self supporting structure thereof; heating the thus formed coherent structure in a hydrogen atmosphere and at a temperature between about 650° C. and 750° C. thereby reducing said basic nickel carbonate of said first and second layers to metallic nickel and also forming gaseous decomposition products, thereby forming a porous coherent sintered nickel body of said compressed superposed layers; and removing said pulverulent pore-forming material from the portion of said coherent sintered nickel body formed of said second layer without causing removal of nickel, whereby a coherent sintered nickel body is formed consisting of a first portion formed of said first layer and having pores of relatively small radius and a lesser overall porosity, and a second portion integral with said first portion formed of said second layer, and having pores of relatively greater radius and a greater overall porosity due to the removal of said pore-forming material.

7. A method of producing a sintered body capable of forming a gas-impermeable cathode structure for a fuel cell, comprising the step of forming, superposed upon each other, a first pulverulent layer consisting essentially of a first mixture of between 60% and 40% of carbonyl nickel powder and of between 40 and 60% of a basic nickel carbonate, and a second pulverulent layer having a thickness not exceeding the thickness of the first layer and consisting essentially of a mixture of between 40 and 60% by volume of said first mixture and between 60 and 40% by volume of a pulverulent pore-forming material consisting of a mixture of ammonium carbonate and sodium chloride which can be removed under conditions which will not cause removal of nickel; jointly compressing said superposed layers thereby forming a coherent self supporting structure thereof; heating the thus formed coherent structure in a hydrogen atmosphere and at a temperature between about 650° C. and 750° C. thereby reducing said basic nickel carbonate of said first and second layers to metallic nickel and also forming gaseous decomposition products, thereby forming a porous coherent sintered nickel body of said compressed superposed layers; and removing said pulverulent pore-forming material from the portion of said coherent sintered nickel body formed of said second layer without causing removal of nickel, whereby a coherent sintered nickel body is formed consisting of a first portion formed of said first layer and having pores of relatively small radius and a lesser overall porosity, and a second portion integral with said first portion form of said second layer, and having pores of relatively greater radius and a greater overall porosity due to the removal of said pore-forming material.

8. A method of producing a sintered body capable of forming a gas-impermeable cathode structure for a fuel cell, comprising the steps of forming, superposed upon each other, a first pulverulent layer consisting essentially of a first mixture of between 60% and 40% of carbonyl nickel powder and of between 40 and 60% of a basic nickel carbonate, and a second pulverulent layer having a thickness not exceeding the thickness of the first layer and consisting essentially of a mixture of between 40 and 60% by volume of said first mixture and between 60 and 40% by volume of a pulverulent pore-forming material which can be gasified at temperatures between about 650° C. and 750° C.; jointly compressing said superposed layers thereby forming a coherent self supporting structure thereof; and heating the thus formed coherent structure in a hydrogen atmosphere and at a temperature between about 650° C. and 750° C. thereby reducing said basic nickel carbonate of said first and second layers to metallic nickel and also forming gaseous decomposition products, to and gasifying and thus removing said pore-forming material, thereby forming a porous coherent sintered nickel body of said compressed superposed layers, whereby a coherent sintered nickel body is formed consisting of a first portion formed of said first layer and having pores of relatively small radius and a lesser overall porosity, and a second portion integral with said first portion formed of said second layer, and having pores of relatively greater radius and a greater overall porosity due to the gasification of said pore-forming material.

9. A method of producing a sintered body capable of forming a gas-impermeable cathode structure for a fuel cell, comprising the steps of forming, superposed upon each other, a first pulverulent layer consisting essentially of a first mixture of between 60% and 40% of carbonyl nickel powder and of between 40 and 60% of a basic nickel carbonate, and a second pulverulent layer having a thickness not exceeding the thickness of the first layer and consisting essentially of a mixture of between 40 and 60% by volume of said first mixture and between 60 and 40% by volume of pulverulent ammonium carbonate; jointly compressing said superposed layers at a pressure sufficient to form a coherent self supporting structure thereof; heating the thus formed coherent structure in a hydrogen atmosphere and at a temperature between about 650° C. and 750° C. thereby reducing said basic nickel carbonate of said first and second layers under formation of metallic nickel and gaseous decomposition products, and gasifying said ammonium carbonate, thereby forming a porous coherent sintered nickel body of said compressed superposed layers, whereby a coherent sintered nickel body is formed consisting of a first portion formed of said first layer and having pores of relatively small radius and a lesser overall porosity, and a second portion integral with said first portion formed of said second layer and having pores of relatively greater radius and a greater overall porosity due to the gasification of said ammonium carbonate.

10. A method of producing a sintered body capable of forming a gas-impermeable cathode structure for a fuel cell, comprising the steps of forming, superposed upon each other, a first pulverulent layer consisting essentially of a first mixture of between 60 and 40% of carbonyl nickel powder and of between 40 and 60% of a basic nickel carbonate, and a second pulverulent layer having a thickness not exceeding the thickness of the first layer and consisting essentially of a mixture of between 40 and 60% by volume of said first mixture and between 60 and 40% by volume of pulverulent sodium chloride pore-forming material which can be removed under conditions which will not cause removal of nickel; jointly compressing said superposed layers thereby forming a coherent self supporting structure thereof; heating the thus formed coherent structure in a hydrogen atmosphere and at a temperature between about 650° C. and 750° C. thereby reducing said basic nickel carbonate of said first and second layers to metallic nickel and also forming gaseous decomposition products, thereby forming a porous coherent sintered nickel body of said compressed superposed layers; and leaching out said pulverulent sodium chloride from the portion of said coherent sintered nickel body formed of said second layer, whereby a coherent sintered nickel body is formed consisting of a first portion formed of said first layer and having pores of relatively small radius and a lesser overall porosity, and a second portion integral with said first portion formed of said second layer, and having pores of relatively greater radius and a greater overall porosity due to the leaching out of said sodium chloride.

11. A method of producing a sintered body capable of forming a gas-impermeable cathode for a fuel cell, comprising the steps of forming, superposed upon each other, a first pulverulent layer consisting essentially of a first mixture of nickel powder and of a pulverulent nickel salt which upon heating in a reducing atmosphere to the sintering temperature of nickel will be decomposed under formation of metallic nickel and gaseous decomposition products, and a second pulverulent layer consisting essentially of a mixture of said first mixture and of a pulverulent pore-forming material which can be removed under conditions which will not cause removal of nickel; jointly compressing said superposed layers, thereby forming thereof a compressed composite layer; heating said compressed composite layer in a reducing atmosphere at a temperature between about 650° C. and 750° C. thereby reducing said pulverulent nickel salt of said layers to metallic nickel and also forming gaseous decomposition products, thereby forming a porous, coherent sintered nickel body of the originally present pulverulent nickel and the nickel formed by reduction of said reducible nickel salt of said two layers; removing said pulverulent pore-forming material from the portion of said coherent sintered nickel body formed of said second layer without causing removal of nickel, thereby increasing the porosity of the latter, whereby a coherent sintered nickel body is formed consisting of two layers of different porosity and integral with each other; and applying a silver coating to the inner porous surface of the thus formed sintered nickel body.

12. A method of producing a sintered body capable of forming a gas-impermeable cathode for a fuel cell, comprising the steps of forming, superposed upon each other, a first pulverulent layer consisting essentially of a first mixture of between 60% and 40% of carbonyl nickel powder and of between 40 and 60% of a basic nickel carbonate, and a second pulverulent layer having a thickness not exceeding the thickness of the first layer and consisting essentially of a mixture of between 40 and 60% by volume of said first mixture and between 60 and 40% by volume of a pulverulent pore-forming material which can be removed under conditions which will not cause removal of nickel; jointly compressing said superposed layers thereby forming a coherent self supporting structure thereof; heating the thus formed coherent structure in a hydrogen atmosphere and at a temperature between about 650° C. and 750° C. thereby reducing said basic nickel carbonate of said first and second layers to metallic nickel and also forming gaseous decomposition products, thereby forming a porous coherent sintered nickel body of said compressed superposed layers; removing said pulverulent pore-forming material from the portion of said coherent sintered nickel body formed of said second layer without causing removal of nickel, whereby a coherent sintered nickel body is formed consisting of a first portion formed of said first layer and having pores of relatively small radius and a lesser overall porosity, and a second portion integral with said first portion formed of said second layer, and having pores of relatively greater radius and a greater overall porosity due to the removal of said pore-forming material; boiling the thus formed porous sintered nickel body in an ammoniacalic aqueous solution of silver carbonate and ammonium carbonate; drying the thus-treated sintered body thereby forming at the pore surfaces therefore a layer including silver carbonate; and reducing said silver carbonate layer to metallic silver at a temperature below the temperature of thermal decomposition of said silver carbonate.

13. A method of producing a sintered body capable of forming a gas-impermeable cathode structure for a fuel cell, comprising the steps of forming, superposed upon each other, a first pulverulent layer consisting essentially of a first mixture of between 60% and 40% of carbonyl nickel powder having a particle size of between 0.5 and 10 microns and of between 40 and 60% of a basic nickel carbonate having a particle size of up to 10 microns, and a second pulverulent layer having a thickness not exceeding the thickness of the first layer and consisting essentially of a mixture of between 40 and 60% by volume of said first mixture and between 60 and 40% by volume of a pulverulent pore-forming material which can be removed under conditions which will not cause removal of nickel; jointly compressing said superposed layers thereby forming a coherent self supporting structure thereof; heating the thus formed coherent structure in a hydrogen atmosphere and at a temperature between about 650° C. and 750° C. thereby reducing said basic nickel carbonate of said first and second layers to metallic nickel and also forming gaseous decomposition products, thereby forming a porous coherent sintered nickel body of said compressed superposed layers; and removing said pulverulent pore-forming material from the portion of said coherent sintered nickel body formed of said second layer without causing removal of nickel, whereby a coherent sintered nickel body is formed consisting of a first portion formed of said first layer and having pores of a radius of a magnitude of up to about $1.5 \times 10^{-4}$ cm. and an overall porosity of about 50%, and a second portion integral with said first portion formed of said second layer, and having pores of greater radius and a greater overall porosity due to the removal of said pore-forming material.

References Cited
UNITED STATES PATENTS

| | | | |
|---|---|---|---|
| 1,988,861 | 1/1935 | Thorausch | 75—200 |
| 2,122,053 | 6/1938 | Burkhardt | 75—222 |
| 2,129,844 | 9/1938 | Kiefer | 75—222 |
| 2,464,517 | 3/1949 | Kurtz | 75—208 |
| 3,195,226 | 7/1965 | Valyi | 75—222 |
| 3,244,515 | 4/1966 | Grune et al. | 75—208 |
| 3,266,893 | 8/1966 | Duddy | 75—222 |

CARL D. QUARFORTH, *Primary Examiner.*

L. DEWAYNE RUTLEDGE, WINSTON A. DOUGLAS,
*Examiners.*

R. L. GRUDZIECKI, N. P. BULLOCH,
*Assistant Examiners.*